US008371822B2

(12) United States Patent
Uselton

(10) Patent No.: US 8,371,822 B2
(45) Date of Patent: Feb. 12, 2013

(54) DUAL-POWERED AIRFLOW GENERATOR

(75) Inventor: Robert B. Uselton, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 399 days.

(21) Appl. No.: 12/186,132

(22) Filed: Aug. 5, 2008

(65) Prior Publication Data
US 2010/0034677 A1 Feb. 11, 2010

(51) Int. Cl.
F04B 49/20 (2006.01)
F04B 49/06 (2006.01)
B23P 15/26 (2006.01)

(52) U.S. Cl. ......... 417/16; 417/42; 417/44.1; 417/223; 29/890.035; 29/888.025

(58) Field of Classification Search .......... 62/236; 417/2, 374, 15–17, 42, 44.1, 223, 319, 423.6; 107/236; 29/888.025, 890.035; 318/66, 318/68, 77, 78, 101, 103, 105, 106, 107
See application file for complete search history.

(56) References Cited

U.S. PATENT DOCUMENTS

| 2,397,183 | A | * | 3/1946 | Kilgore et al. ............. 416/40 |
| 2,581,313 | A | * | 1/1952 | Van Der Woude ........ 192/104 R |
| 3,543,518 | A | * | 12/1970 | Shibata ...................... 290/4 R |
| 3,960,322 | A |  | 6/1976 | Ruff et al. |
| 4,018,581 | A |  | 4/1977 | Ruff et al. |
| 4,900,231 | A | * | 2/1990 | Kennedy ..................... 417/16 |
| 5,826,435 | A |  | 10/1998 | Hange |
| 6,253,563 | B1 | * | 7/2001 | Ewert et al. ................ 62/235.1 |
| 6,481,974 | B2 | * | 11/2002 | Horng et al. ................... 417/42 |
| 7,126,294 | B2 | * | 10/2006 | Minami et al. ............... 318/139 |
| 7,266,962 | B2 | * | 9/2007 | Montuoro et al. ............. 62/236 |
| 7,310,966 | B2 |  | 12/2007 | Wagner |
| 2005/0103615 | A1 |  | 5/2005 | Ritchey |
| 2006/0260335 | A1 | * | 11/2006 | Montuoro et al. ............. 62/236 |
| 2006/0288720 | A1 |  | 12/2006 | Jmaev |
| 2007/0017241 | A1 | * | 1/2007 | Hyland et al. ................. 62/236 |
| 2007/0089444 | A1 |  | 4/2007 | Chen |
| 2008/0000247 | A1 |  | 1/2008 | Sinha et al. |

FOREIGN PATENT DOCUMENTS

| DE | 2912950 A1 | 10/1980 |
| DE | 3802336 C1 | 4/1989 |
| DE | 202004016620 U1 | 3/2005 |
| DE | 202004016620 | * 5/2005 |
| WO | 0121944 A1 | 3/2001 |

OTHER PUBLICATIONS

Related case—European Search Report dated Nov. 24, 2009 for EP Application No. 09167243.6-2315; 5 Pages.

* cited by examiner

Primary Examiner — Charles Freay
Assistant Examiner — Bryan Lettman

(57) ABSTRACT

A dual-powered airflow generator comprising: a primary fan motor powered from a primary power source and an auxiliary fan motor powered from a secondary power source. In one embodiment, the primary fan motor has a first drive shaft wherein operation of the primary fan motor causes a desired airflow at a design power of the primary power source. In a preferred embodiment, the auxiliary fan motor is powered from a secondary power source and has a second drive shaft mechanically coupled to the primary fan motor, wherein the auxiliary fan motor is configured to assist the primary fan motor in causing the desired airflow while the primary fan motor operates from the primary power source at a reduced power. In a preferred embodiment, the auxiliary fan motor is powered by a solar power generating device or other alternative energy source.

18 Claims, 4 Drawing Sheets

US 8,371,822 B2

DUAL-POWERED AIRFLOW GENERATOR

TECHNICAL FIELD OF THE INVENTION

The present invention is directed, in general, to an airflow generator and, more specifically, to a dual powered airflow generator for use with a heat pump, air handler, etc.

BACKGROUND OF THE INVENTION

Secondary sources of electrical power to supplement commercial line voltage have been of interest for several decades. Among the most successful of secondary sources has been solar power. Solar power has been used successfully in many applications. Of course, the success of such applications depend upon: (1) the availability of solar radiation when needed, (2) the ability to store power generated by solar radiation until the power is needed and solar radiation is unavailable, and (3) the ability to integrate solar-generated power with conventional power without degrading overall system performance.

In the field of air conditioning, solar power has been used to operate: (a) a boiler/condenser heat engine, (b) a reciprocating piston heat engine, (c) a motor to operate a compressor and a second motor to operate a condenser fan, and (d) to power a heat pump. However, these applications generally rely on solar energy to power the designed function without simultaneous reliance on another primary power source, such as commercial line AC or DC electricity. When solar energy is not available, the systems generally revert to operating solely on the available primary power source.

Accordingly, what is needed in the art is an airflow generator for an air conditioning/heat pump system that allows simultaneous integration of a secondary power source along with a primary power source without the need for complex electronics to integrate the two sources of power.

SUMMARY OF THE INVENTION

To address the above-discussed deficiencies of the prior art, the present invention provides a dual-powered airflow generator comprising: a primary fan motor powered from a primary power source and an auxiliary fan motor powered from a secondary power source. In one embodiment, the primary fan motor has a first drive shaft wherein operation of the primary fan motor causes a desired airflow at a design power of the primary power source. In a preferred embodiment, the auxiliary fan motor is powered from a secondary power source and has a second drive shaft mechanically coupled to the primary fan motor, wherein the auxiliary fan motor is configured to assist the primary fan motor in causing the desired airflow while the primary fan motor operates from the primary power source at a reduced power. In a preferred embodiment, the auxiliary fan motor is powered by a solar power generating device or other alternative energy source.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
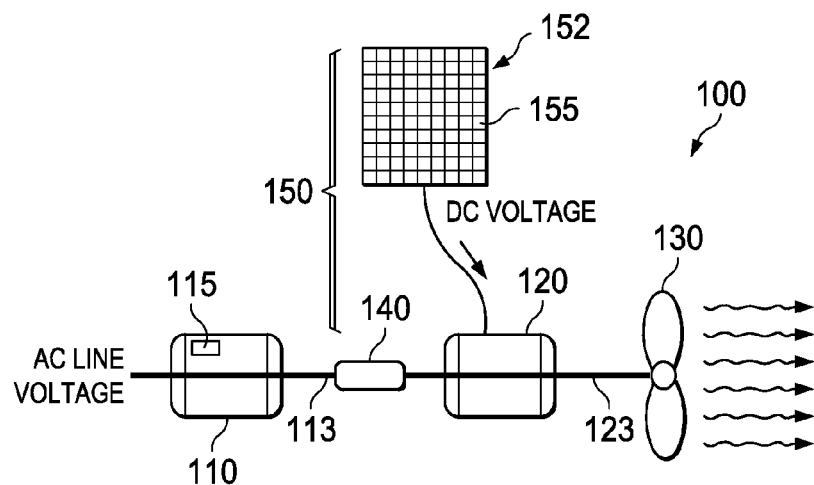
FIG. 1 illustrates one embodiment of a dual-powered airflow generator constructed according to the principles of the present invention.

Referring initially to FIG. 1, illustrated is one embodiment of a dual-powered airflow generator 100 constructed according to the principles of the present invention. The dual-powered airflow generator 100 comprises a primary fan motor 110, an auxiliary fan motor 120, a fan 130, and a shaft coupler 140. In a preferred embodiment, the primary fan motor 110 comprises a variable-speed AC motor having a first drive shaft 113 and a microcontroller 115. The fan 130 is mechanically coupled to the first drive shaft 113 through second drive shaft 123 and shaft coupler 140. A variety of different fan motors may be used with the dual-powered airflow generator 100. For example, the most common fractional-horsepower motor type used in airflow generators, i.e., air conditioning systems, air handlers, etc., is the permanent-split capacitor (PSC) induction motor. However, this motor does not reduce its power consumption linearly with an auxiliary fan motor output, so it is not the best choice for this application intended to conserve primary electrical energy. The best motor type currently available is an electronically-commutated, brushless permanent magnet motor (ECM-BPM). Several manufacturers produce such a product, as: General Electric by Regal-Beloit (USA), EBM-Papst (Germany) and Delta Products (Taiwan). These ECM-BPM motors are AC-powered, variable speed electric motors wherein the microcontroller 115 will maintain a selected speed of the fan 130 by adjusting input AC power as needed.

In a preferred embodiment, the auxiliary fan motor 120 is a brushless permanent magnet DC motor having a second drive shaft 123 and powered by an auxiliary power system 150. The second drive shaft 123 is mechanically coupled to the first drive shaft 113 with the shaft coupler 140. In one embodiment, the shaft coupler 140 may be a rigid shaft coupler 140. Alternatively, the shaft coupler 140 may be a flexible shaft coupler 140. One who is of skill in the art is familiar with rigid mechanical shaft couplers and flexible mechanical shaft couplers.

In one embodiment, the auxiliary power system 150 is a solar-power generating system, e.g., a solar array in the form of a photovoltaic panel 152, etc. When exposed to sunlight, the photovoltaic panel 152 comprising a plurality of photovoltaic cells 155 generates DC electric power that may be used to power the auxiliary fan motor 120. One who is of skill in the art is familiar with photovoltaic cells and how they generate DC electrical power from sunlight. Of course, sunlight is not always of a constant level of intensity, e.g., a partly cloudy day may have periods of direct unimpeded sunlight falling upon the photovoltaic panel, thereby generating peak power. That peak power will turn the auxiliary fan motor 120 at the maximum rpm consistent with the capability of the auxiliary fan motor 120. However, during a partly cloudy day, episodic appearance of cloud layers will likely appear in the sky, thereby temporarily obstructing part or all of the sunlight directed at the particular location of the photovoltaic panel 152. During these partial or total obstructions of sunlight, the power output of the photovoltaic panel 152 will decrease in accordance with the available sunlight at the surface of the photovoltaic panel 152. Therefore, the torque to turn the second drive shaft 123 will vary with the available sunlight. Furthermore, the intensity of the sunlight impinging upon the photovoltaic panel 152 will vary as the angle of the sun's rays falling upon a particular geographical location changes with the seasons. Therefore, the available solar power will vary considerably from day to day, or week to week. This is significant when the airflow generator 100 is part of a heat pump system and therefore operational throughout the year. While the present discussion has centered on a solar-powered auxiliary power system, other power systems, e.g., wind power, battery, rectified DC, etc., may also be used; independently or together with the solar-powered auxiliary power system. As the available solar power varies, the microcontroller 115 will sense the first drive shaft speed which is being spun at the same rate as the second drive shaft because of the mechanical coupling, and the microcontroller will apply or reduce power to the primary fan motor 110 so as to maintain a set rpm of the fan 130. Thus, even when the photovoltaic panel 152 is partially obscured by clouds or other obstructions, a battery or other electrical energy storage device may provide secondary power to the auxiliary motor.

Figure 2:
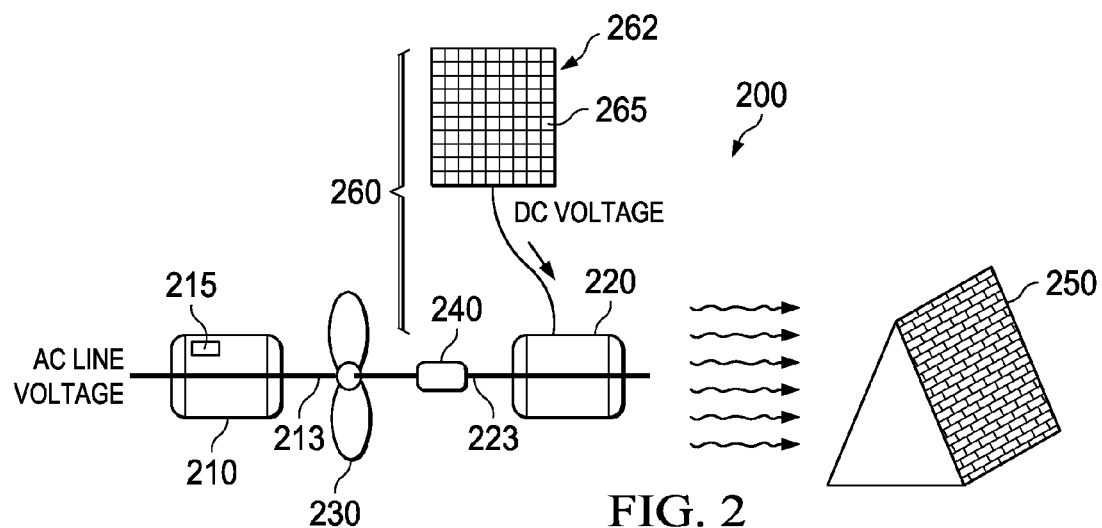
FIG. 2 illustrates an alternative embodiment of a dual-powered airflow generator constructed according to the principles of the present invention.

Referring now to FIG. 2, illustrated is an alternative embodiment of a dual-powered airflow generator 200 constructed according to the principles of the present invention. The dual-powered airflow generator 200 comprises a primary fan motor 210, an auxiliary fan motor 220, a fan 230, a shaft coupler 240, and a heat exchanger 250. An auxiliary power system 260 comprising a photovoltaic panel 262 of a plurality of photovoltaic cells 265 is coupled to the auxiliary fan motor 220. In a preferred embodiment, the primary fan motor 210 comprises a variable-speed AC motor having a first drive shaft 213 and a microcontroller 215. The fan 230 is mechanically coupled to the first drive shaft 213. In a preferred embodiment, the primary fan motor 210 is a General Electric® Model #142 motor or similar, as above. The fan 230 directs a set airflow across, through or over the heat exchanger 250.

The auxiliary fan motor 220 is a brushless permanent magnet DC motor having a second drive shaft 223 and powered by the auxiliary power system 260. The second drive shaft 223 is mechanically coupled to the first drive shaft 213 with the shaft coupler 240. In an alternative embodiment, the shaft coupler 240 may be an overrunning clutch 240. The overrunning clutch 240 allows the second drive shaft 123 to idle when there is inadequate power from the auxiliary power system 260. The AC fan motor 210 provides torque to turn the fan 230 at a set speed under the control of the microcontroller 215. As increasing power is available from the auxiliary power system 260, primary AC power applied to the primary fan motor 210 is decreased and the fan speed maintained. Of course, alternative sources of electricity, e.g., wind generators, etc., may be employed in place of or to supplement the auxiliary power system 260.

Figure 3:
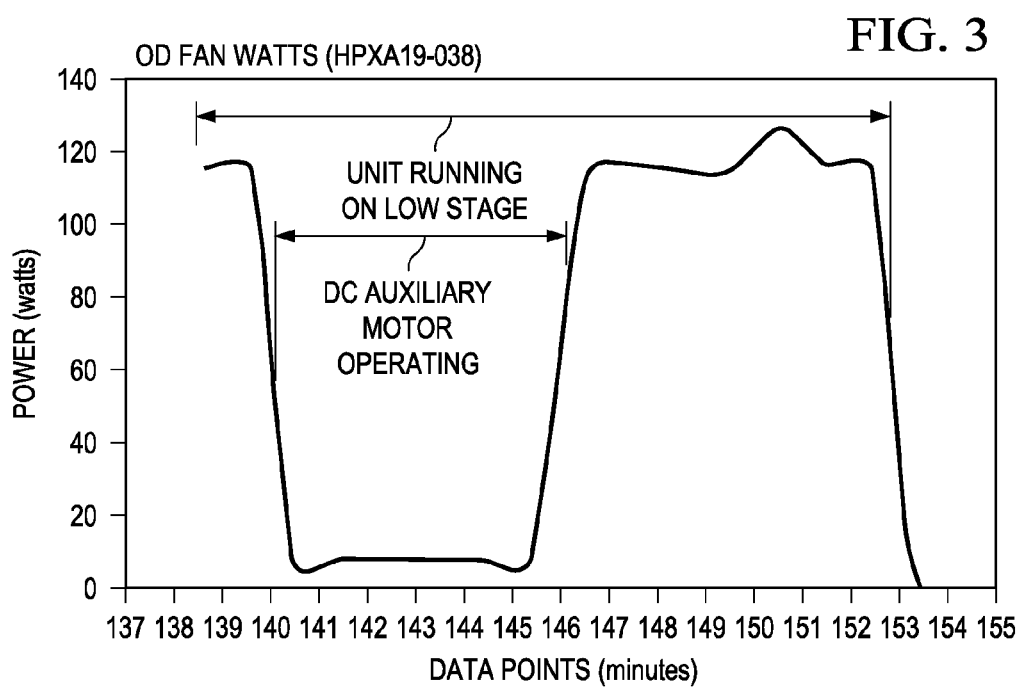
FIG. 3 illustrates a graph of power in watts drawn by an AC fan motor prototype while operating simultaneously with a simulated DC photovoltaic power system powering the auxiliary fan motor.

Referring now to FIG. 3 with continuing reference to FIG. 2, illustrated is a graph of power in watts drawn by an AC fan motor 210 prototype while operating simultaneously with a simulated DC photovoltaic power system powering the auxiliary fan motor 220. As can be seen, with the DC auxiliary fan motor 220 operating between 140 minutes and 146 minutes elapsed time, the power required by the AC primary fan motor 210 to maintain a constant speed of the fan 230 drops from about 117 watts to about 5 watts when the auxiliary fan motor 220 is operating.

Figure 4A:
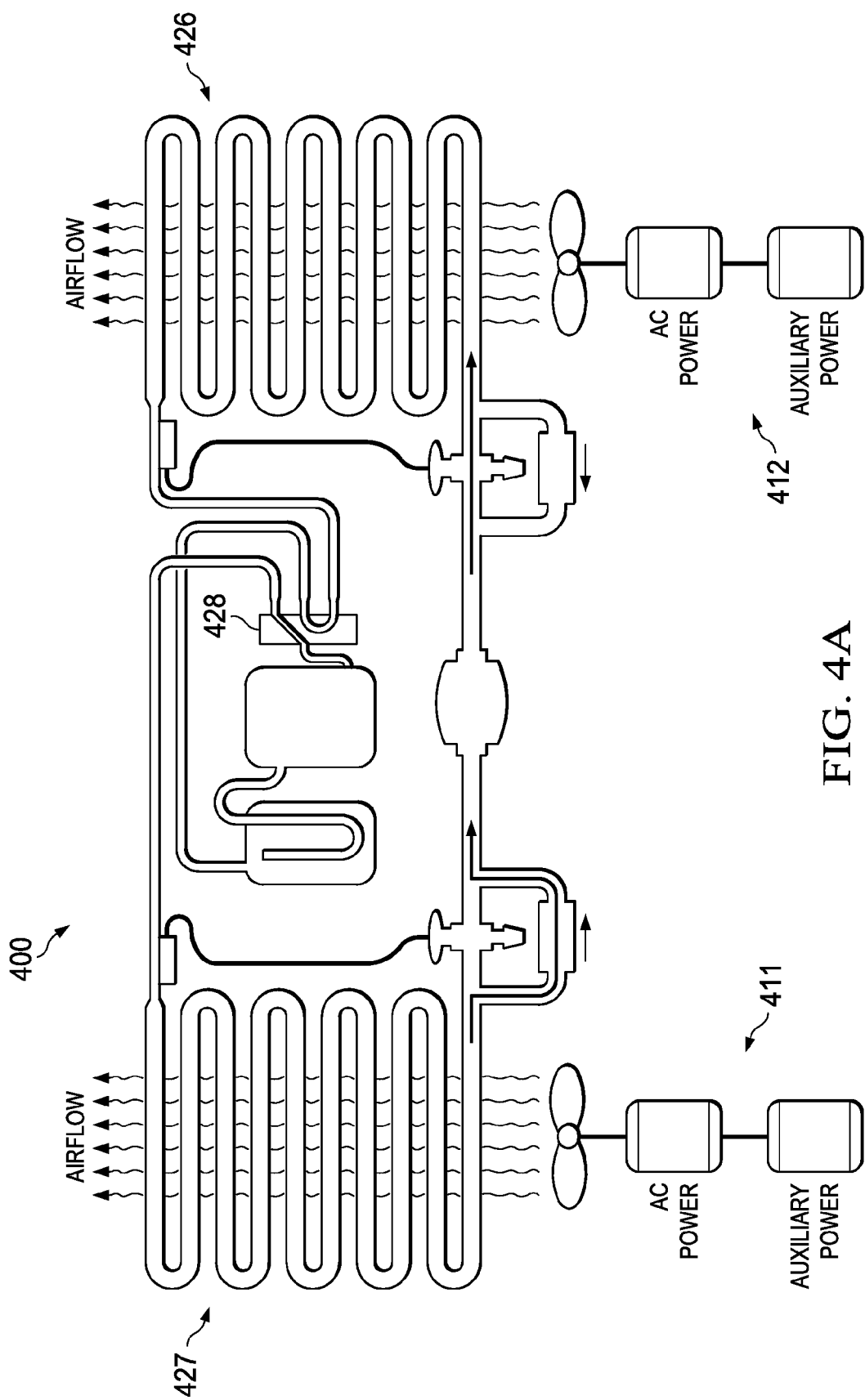
FIG. 4A illustrates a block diagram of a generalized heat pump system employing first and second dual-powered airflow generators in the heating mode.

Referring now to FIG. 4A, illustrated is a block diagram of a generalized heat pump system 400 employing first and second dual-powered airflow generators 411, 412 constructed according to the principles of the present invention. The heat pump system 400 comprises: first and second dual-powered airflow generators 411, 412; an outside coil 426, an inside coil 427 and a four-way reversing valve 428. One who is of skill in the art is familiar with the layout and operation of a heat pump system.

Figure 4B:
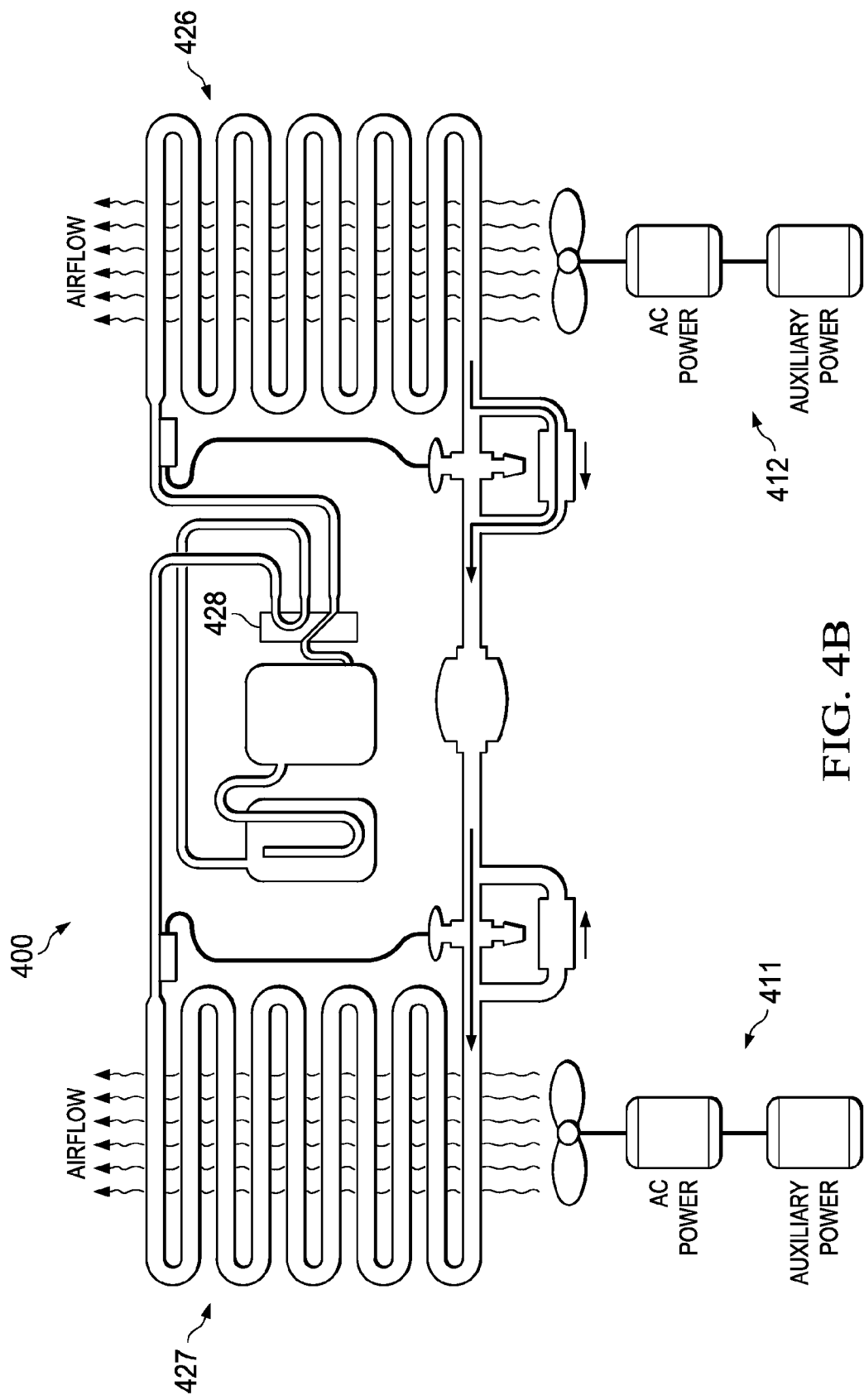
FIG. 4B illustrates the heat pump system of FIG. 4A in the cooling mode.

In the illustrated form of FIG. 4A, the outside coil 426 is functioning as an evaporator and the inside coil 427 is functioning as a condenser. In contrast, FIG. 4B illustrates the heat pump of FIG. 4A in the cooling mode. The outside coil 426 is functioning as a condenser and the inside coil 427 is functioning as an evaporator. Four-way valve 428 enables the heat pump system 400 to change from heating to cooling an interior workspace. Regardless of the heating/cooling configuration of the heat pump system 400, the first and second dual-powered airflow generators 411, 412 cause airflow across, over or through their respective heat exchangers 426, 427. Both the first and second dual-powered airflow generators 411, 412 employ conventional AC line voltage to primarily power their respective fans and an auxiliary power to power their respective auxiliary motors. Of course, backup power systems such as batteries, etc., may also be included in the system to provide supplemental power when solar power is unavailable.

Thus, a DC auxiliary fan motor system for a condenser fan unit cooperating with a AC primary fan motor through a mechanical coupling of the respective motor drive shafts has been described. In a preferred embodiment, the DC auxiliary fan motor system is powered by a photovoltaic solar power generator. The power required by the AC primary fan motor to maintain a set fan speed in conjunction with the auxiliary fan motor is controlled by a microcontroller incorporated in the AC primary fan motor.

Although the present invention has been described in detail, those skilled in the art should understand that they can make various changes, substitutions and alterations herein without departing from the spirit and scope of the invention in its broadest form.

What is claimed is:

1. An air conditioning system having a dual-powered airflow generator, comprising:
   a heat exchanger;
   a variable speed fan motor powered from an alternating current (AC), primary power source and having a first drive shaft and a fan coupled thereto, wherein operation of said variable speed fan motor causes a desired airflow at a design power toward said heat exchanger;
   an auxiliary fan motor powered from a secondary, direct current (DC) power source and having a second drive shaft mechanically coupled to said variable speed fan motor to assist said variable speed fan motor in causing said desired airflow toward said heat exchanger; and
   a microcontroller coupled to said variable speed fan motor and configured to sense a speed of said first drive shaft and apply or reduce said AC primary power source to said variable speed fan motor so that a speed of said fan remains constant when a power flow to said auxiliary fan motor from said DC power source is reduced.

2. The airflow generator as recited in claim 1 further comprising a shaft coupler configured to mechanically couple said first drive shaft to said second drive shaft.

3. The airflow generator as recited in claim 2 wherein said shaft coupler is a flexible shaft coupler.

4. The airflow generator as recited in claim 1 further comprising an overrunning clutch coupled between said first drive shaft and said second drive shaft.

5. The airflow generator as recited in claim 1 further comprising a solar array electrically coupled to said auxiliary fan motor and providing said secondary DC power source.

6. The airflow generator as recited in claim 1 further comprising a wind-powered electric generator coupled to said auxiliary fan motor and providing said secondary DC power source.

7. The airflow generator as recited in claim 1 wherein said auxiliary fan motor is a brushless permanent magnet DC motor.

8. The airflow generator as recited in claim 1 wherein said variable speed fan motor is an electronically-commutated, brushless permanent magnet motor.

9. The airflow generator as recited in claim 1 wherein said heat exchanger is a condenser or an evaporator of a heat pump.

10. A method of manufacturing an air conditioning system having a dual powered airflow generator, comprising:
providing a variable speed fan motor powered from an alternating current (AC), primary power source and having a first drive shaft and a fan coupled thereto wherein operation of said variable speed fan motor causes a desired airflow at a design power toward a heat exchanger;
mechanically coupling a second drive shaft of an auxiliary fan motor to said variable speed fan motor, wherein said auxiliary fan motor is powered from a secondary, direct current (DC) power source to assist said variable speed fan motor in causing said desired airflow toward said heat exchanger; and
coupling a microcontroller to said variable speed fan motor that is configured to sense a speed of said first drive shaft and apply or reduce said AC power source to said variable speed fan motor, so that a speed of said fan remains constant when a power flow to said auxiliary fan motor from said DC power source is reduced.

11. The method as recited in claim 10 further comprising interposing a mechanical shaft coupler between said first drive shaft and said second drive shaft.

12. The method as recited in claim 11 wherein said mechanical shaft coupler is a flexible shaft coupler.

13. The method as recited in claim 10 further comprising coupling an overrunning clutch between said first drive shaft and said second drive shaft.

14. The method as recited in claim 10 further comprising electrically coupling a solar array to said auxiliary fan motor wherein said solar array is configured to provide said secondary DC power source.

15. The method as recited in claim 10 further comprising electrically coupling a wind-powered electric generator to said auxiliary fan motor wherein said wind-powered electric generator is configured to provide said secondary DC power source.

16. The method as recited in claim 10 wherein said auxiliary fan motor is a brushless permanent magnet DC motor.

17. The method as recited in claim 10 wherein said primary fan motor is an electronically-commutated, brushless permanent magnet motor.

18. The airflow generator as recited in claim 10 wherein said heat exchanger is a condenser or an evaporator of a heat pump.

* * * * *